(No Model.) 2 Sheets—Sheet 1.
E. B. BALL.
APPARATUS FOR DRYING FRUIT JARS.
No. 538,313. Patented Apr. 30, 1895.
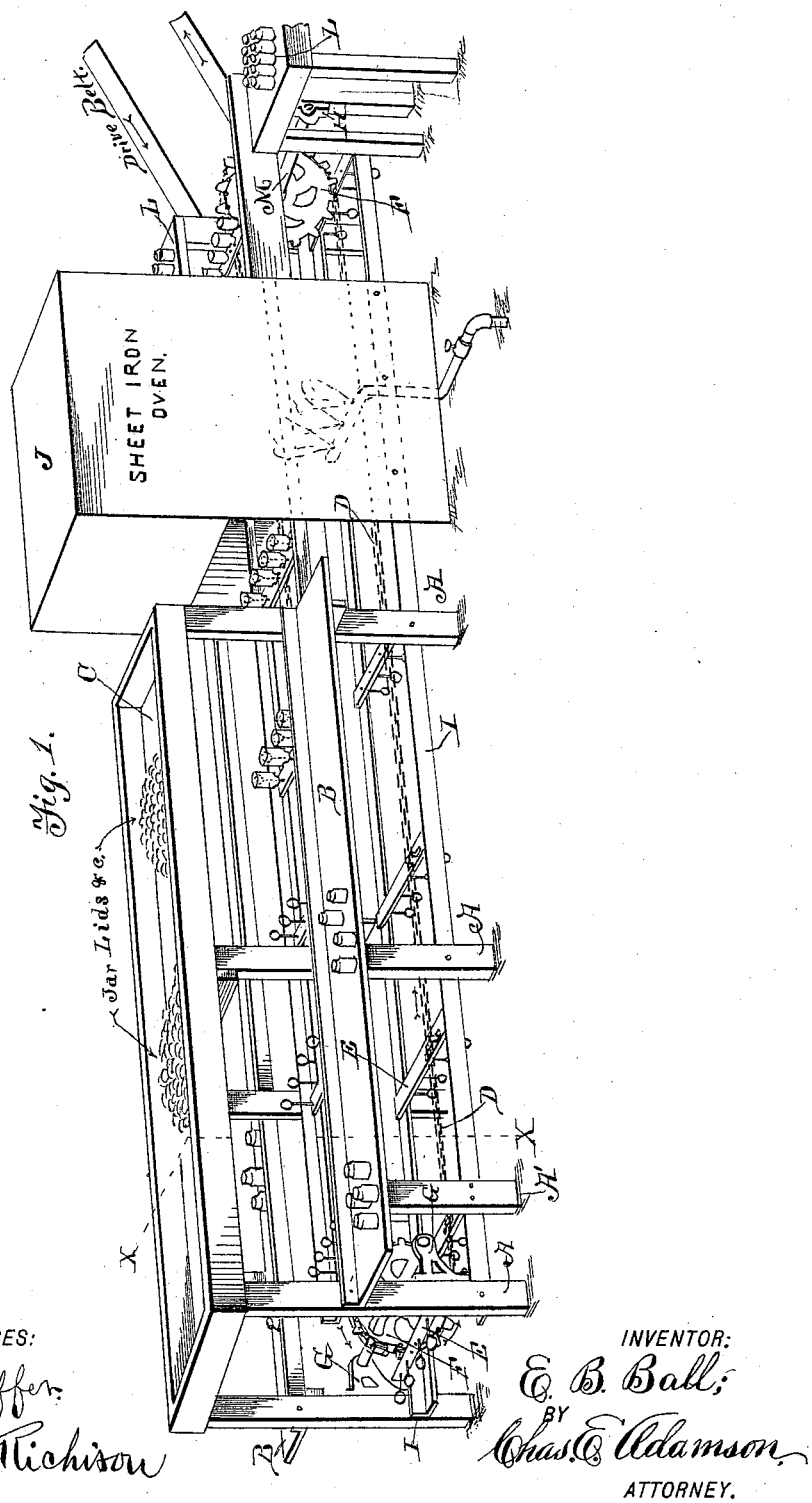

(No Model.) 2 Sheets—Sheet 2.
E. B. BALL.
APPARATUS FOR DRYING FRUIT JARS.
No. 538,313. Patented Apr. 30, 1895.
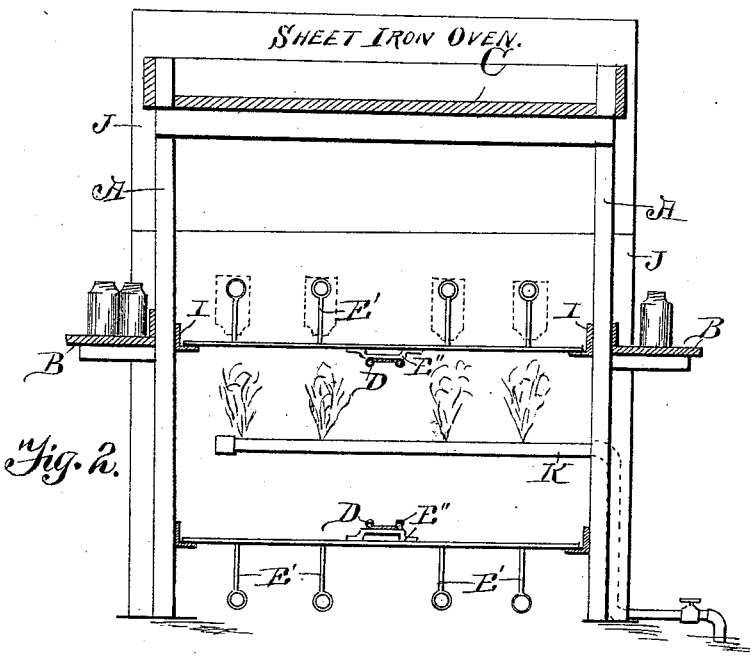
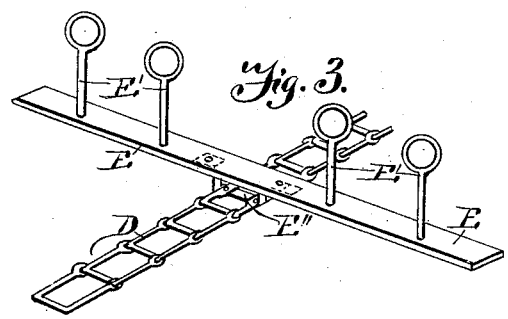
WITNESSES:
L. Schaeffer.
W. A. Richison
INVENTOR:
E. B. Ball.
BY
Chas. E. Adamson.
ATTORNEY.

UNITED STATES PATENT OFFICE.

EDMUND BURK BALL, OF MUNCIE, INDIANA.

APPARATUS FOR DRYING FRUIT-JARS.

SPECIFICATION forming part of Letters Patent No. 538,313, dated April 30, 1895.

Application filed March 29, 1894. Serial No. 505,594. (No model.)

*To all whom it may concern:*

Be it known that I, EDMUND BURK BALL, a citizen of the United States, residing at Muncie, in the county of Delaware and State of Indiana, have invented certain new and useful Improvements in Apparatus for Drying Fruit-Jars; and I do hereby declare the following to be a full, clear, and exact description of the invention, such as will enable others skilled in the art to which it appertains to make and use the same.

My invention relates to improvements in an apparatus for drying and handling fruit jars in the process of their finishing and packing for shipment; and the objects are to provide an apparatus with a traveling belt or carrier so that the jars may be taken from the grinding and washing tables and carried through a drying oven, then to a delivery table, at which table the jars are taken off of the carriers, supplied with their lids and fittings and packed in boxes for shipment. I attain these objects by the mechanism illustrated by the accompanying drawings, in which—

Figure 1 is a perspective view of my apparatus complete and in running order. Fig. 2 is a vertical cross section of my apparatus taken on line X X of Fig. 1; and Fig. 3 is a detail view of one of the jar racks with a portion of the link belt attached.

Similar letters refer to similar parts throughout the several views.

In constructing my apparatus, I do not confine myself to the exact construction as shown in the drawings, as my apparatus may be applied to any sized oven or any number of traveling carriers, may be employed according to the output of the factory, and the kinds of glass goods turned out.

In the drawings, I show my device especially arranged for handling fruit jars and the oven being heated by natural gas. The frame may be of any desired length or size, having upright posts A, side shelves or tables B, and upper receptacle C, all as shown in Figs. 1 and 2. The posts A are set in line and a suitable distance from each other in order to support the said tables B and receptacle C. Two lines of these posts are set a suitable distance apart, so that they form two working sides or delivery tables B, and between which the endless link belt D carries the jar racks E, as shown in Figs. 1 and 2. The link belt is run by two sprocket wheels F F one at each end of the apparatus. One wheel is journaled to hangers G at the rear end of the delivery frame or tables and the other to boxings H at the front end of the apparatus.

To the inside of the post A are secured the L-iron tracks I upon which the ends of the jar racks E slide. These irons are made in an "L" form and are secured so as to form an upper and lower set of tracks, as shown in Figs. 1 and 2. By making the tracks L shaped the ends of the racks will abut against the sides of the L irons and thus prevent any swaying or lateral movement of the chain and racks between the sprocket wheels. The upper set forms the track upon which the ends of the jar racks slide as they go on their outward movement. This set does not extend out at the rear end of the frame as far as the lower set, in order that the racks may make their turn downward around the wheel in starting on the return movement. The lower set of tracks may extend to the outer post A but the upper set are terminated on the short posts A', as shown in Fig. 1. These jar racks consist of a thin flat iron bar E having four more or less pins E' set into each bar with rings or heads formed on the outer ends upon which the jars rest by being set bottom upward, the pins extending up into the jars. In this manner the jars drain themselves while being transported to their point of delivery and this also allows a portion of the gas flame over which they travel while passing through the oven to enter the jars, warming and drying them. The jar racks are secured to the link belt a proper distance apart by any suitable fastening, such as a U-shaped loop E" riveted to the said bar E and link belt D, as shown in Fig. 3. By using this U shaped loop E" the racks are supported a sufficient distance above the chain not to strike the teeth of the sprocket wheels when the chain is in operation.

Near the forward end of the apparatus a sheet iron oven J is placed in line with the framework so that the tracks I extend through it. A gas pipe K is arranged in the said oven just under the upper tracks and crosswise of the said tracks so that flames of gas will envelop the jars as they pass through the oven on the racks E.

The operation of my apparatus is as follows: The upper shelf or receptacle C is filled with the jar fittings, such as lids, &c. The fire is started in the oven. The jars are placed on the front tables L L as they come up wet from the grinding and washing process. Workmen place the jars on the pins E' of the moving racks as they come up at the forward end of the machine between the two tables. The drive belt working on a pulley on the drive shaft M, keeps the sprocket wheels F F moving, carrying the jars first into and through the oven, over the gas flames, then on along the delivery tables from where the said jars are removed by workmen, and finally completed by having their lids fitted on and packed in shipping boxes.

In the finishing of glass fruit jars it is necessary to grind the upper ends of the necks off smooth, after which the jars are dipped into water to rinse off the grindings. It is then necessary to dry the jars before packing them, and it is for this purpose I arrange my apparatus for first drying the jars, and then delivering them in order along the packing tables.

I do not confine my invention to the use of fruit jars only or to the exact construction shown, but,

Having thus described my invention, I claim the following and desire to secure the same by Letters Patent:

In a jar drier, the combination with a supporting frame and oven, of sprocket wheels supported on the frame, an endless chain on the sprocket wheels, lateral racks secured to and supported above the chain, vertical pins on the racks and tracks on opposite sides of the frame for supporting the ends of the racks, substantially as described.

In testimony whereof I affix my signature in presence of two witnesses.

EDMUND BURK BALL.

Witnesses:
JAMES E. HAFFNER,
JOHN O. ADAMS.